United States Patent
Lee et al.

(10) Patent No.: US 12,095,826 B2
(45) Date of Patent: Sep. 17, 2024

(54) METHOD AND APPARATUS FOR SUPPORTING CALL ACCORDING TO PLURALITY OF MODES

(71) Applicant: Samsung Electronics Co., Ltd., Suwon-si (KR)

(72) Inventors: Hakju Lee, Suwon-si (KR); Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 17/393,812

(22) Filed: Aug. 4, 2021

(65) Prior Publication Data

US 2022/0070228 A1    Mar. 3, 2022

(30) Foreign Application Priority Data

Aug. 27, 2020    (KR) .................. 10-2020-0108638

(51) Int. Cl.
*H04L 65/1066*    (2022.01)
*G06T 3/403*    (2024.01)
(Continued)

(52) U.S. Cl.
CPC ........ *H04L 65/1066* (2013.01); *G06T 3/4092* (2013.01); *H04L 65/403* (2013.01);
(Continued)

(58) Field of Classification Search
CPC ............... H04L 47/748; H04L 65/1094; H04L 65/1104; H04L 67/04; H04L 67/148;
(Continued)

(56) References Cited

U.S. PATENT DOCUMENTS 9,875,647 B1 * 1/2018 Tannenbaum .......... G06F 21/42
2009/0092093 A1    4/2009 Wu et al.
(Continued)

FOREIGN PATENT DOCUMENTS

EP    3288230 A1 *    2/2018    ............. H04L 29/06
EP    3 461 096 A1    3/2019
(Continued)

OTHER PUBLICATIONS

Extended European Search Report dated Oct. 23, 2023, issued in European Patent Application No. 21861929.4.
(Continued)

*Primary Examiner* — Asghar H Bilgrami
(74) *Attorney, Agent, or Firm* — Jefferson IP Law, LLP (57) ABSTRACT

A $5^{th}$ generation (5G) or $6^{th}$ generation (6G) communication system for supporting a higher data transfer rate beyond a $4^{th}$ generation (4G) communication system, such as a long term evolution (LTE) system and a method for supporting, by a first terminal, switching between a plurality of modes for a call is provided. The method includes performing a capability negotiation for a call with a second terminal, and establishing a first connection between the first terminal and a call server according to a first mode among the plurality of modes for the call with the second terminal after performing the capability negotiation, wherein the performing of the capability negotiation includes transmitting a first message including information indicating a media attribute of each of two or more modes of the plurality of modes to the call server.

14 Claims, 6 Drawing Sheets (51) Int. Cl.
*G06T 3/4092* (2024.01)
*H04L 47/74* (2022.01)
*H04L 65/1016* (2022.01)
*H04L 65/1094* (2022.01)
*H04L 65/1104* (2022.01)
*H04L 65/403* (2022.01)
*H04L 67/04* (2022.01)
*H04L 67/148* (2022.01)
*H04L 67/55* (2022.01)
*H04L 69/24* (2022.01)
*H04W 28/02* (2009.01)
*H04W 76/11* (2018.01)
*H04W 76/12* (2018.01)
*H04W 76/22* (2018.01)
*H04W 76/30* (2018.01)

(52) U.S. Cl.
CPC ............ *H04W 76/11* (2018.02); *H04W 76/30* (2018.02); *H04L 65/1016* (2013.01)

(58) Field of Classification Search
CPC ..... H04L 67/55; H04L 69/24; H04L 65/1069; H04L 65/1089; H04L 65/1083; H04L 65/1045; H04L 65/1016; H04L 65/1066; H04L 65/403; H04W 28/0215; H04W 76/12; H04W 76/22; H04W 76/11; H04W 76/30; G06T 3/4092
See application file for complete search history.

(56) References Cited

U.S. PATENT DOCUMENTS

| | | | | |
|---|---|---|---|---|
| 2009/0245233 | A1* | 10/2009 | Prasad | H04L 65/1046 370/352 |
| 2010/0169495 | A1* | 7/2010 | Zhang | H04L 65/1095 709/227 |
| 2011/0231553 | A1* | 9/2011 | Patel | H04L 65/1094 709/227 |
| 2011/0249073 | A1 | 10/2011 | Cranfill et al. | |
| 2012/0137008 | A1* | 5/2012 | Atarius | H04L 65/1083 709/227 |
| 2016/0261643 | A1* | 9/2016 | Pettersson | H04L 65/70 |
| 2021/0006614 | A1* | 1/2021 | Oyman | H04N 19/30 |

FOREIGN PATENT DOCUMENTS

| | | |
|---|---|---|
| KR | 10-1070941 B1 | 10/2011 |
| KR | 10-2016-0075779 A | 6/2016 |
| WO | WO-2018017736 A1 * | 1/2018 ....... H04L 29/06414 |

OTHER PUBLICATIONS

International Search Report dated Nov. 18, 2021, issued in International Application No. PCT/KR2021/010483.

* cited by examiner

METHOD AND APPARATUS FOR SUPPORTING CALL ACCORDING TO PLURALITY OF MODES

CROSS-REFERENCE TO RELATED APPLICATION(S)

This application is based on and claims priority under 35 U.S.C. 119(a) of a Korean patent application number 10-2020-0108638, filed on Aug. 27, 2020, in the Korean Intellectual Property Office, the disclosure of which is incorporated by reference herein in its entirety.

BACKGROUND

1. Field

The disclosure relates to a method and an apparatus for supporting a call according to a plurality of modes. More particularly, the disclosure relates to a support of a plurality of modes of a call using a terminal and an auxiliary terminal (e.g., an augmented reality (AR) device) connected to the terminal.

2. Description of Related Art

Looking back on the development of wireless communication over the generations, technologies have been developed mainly for human-oriented services, such as voice, multimedia, and data services. It is expected that connected devices, which have been explosively increasing since the commercialization of a fifth-generation (5G) communication system, will be connected to a communication network. Examples of things connected to a network may include vehicles, robot, drones, home appliances, display, smart sensors installed in various types of infrastructure, construction machines, and factory equipment. Mobile devices are expected to evolve into various form factors, such as augmented reality glasses, virtual reality headsets, and hologram devices. To provide various services by connecting hundreds of billions of devices and things in a $6^{th}$-generation (6G) era, efforts are being made to develop an improved 6G communication system. For this reason, a 6G communication system is referred to as a beyond 5G communication system.

In the 6G communication system, which is predicted to be realized around 2030, the maximum transmission speed corresponds to terabits per second (i.e., at least 1,000 gigabits per second), and the wireless latency time is 100 microseconds (usec). For example, in the 6G communication system, the transmission speed is 50 times faster than that in the 5G communication system, and the wireless latency time is reduced by one-tenth.

In order to achieve a high data transmission rate and an ultra-low latency, implementing the 6G communication system in a terahertz band (e.g., a band from 95 gigahertz (95 GHZ) to 3 terahertz (3 THz)) is being considered. In the terahertz band, compared to a millimeter-wave (mmWave) band introduced in 5G, the importance of a technique for guaranteeing the range, i.e., the coverage, of a signal is expected to increase due to serious path loss and atmospheric absorption. As major techniques for guaranteeing coverage, multiple antenna transmission techniques, such as a new waveform, beamforming, massive multiple-input and multiple-output (massive MIMO), full dimensional MIMO (FD-MIMO), an array antenna, and a large scale antenna, which are superior in terms of coverage to a radio frequency (RF) device, an antenna, and orthogonal frequency division multiplexing (OFDM), need to be developed. In addition, new techniques, such as metamaterial-based lenses and antennas, high-dimensional spatial multiplexing using orbital angular momentum (OAM), and a reconfigurable intelligent surface (RIS), are under discussion in order to improve the coverage of a signal in a terahertz band.

Further, in the 6G communication system, to improve frequency efficiency and to enhance a system network, full duplex that enables an uplink and a downlink to simultaneously use the same frequency resource at the same time, a network technique of using a satellite and high-altitude platform stations (HAPS) in an integrated manner, a network structure innovation technique that supports a mobile base station and enables optimization and automation of a network operation, dynamic spectrum sharing through collision avoidance based on spectrum usage prediction, an AI-based communication technique that realizes system optimization by utilizing artificial intelligence (AI) from a design stage and internalizing an end-to-end AI support function, and a next-generation distributed computing technique that realizes a service of complexity beyond the limit of terminal computation capability by utilizing ultra-high-performance communication and computing resources (mobile edge computing (MEC), cloud, and the like) are under development. In addition, attempts to reinforce connectivity between devices, to optimize a network, to promote the softwarization of network entities, and to increase the openness of wireless communication continue by designing a new protocol to be used in the 6G communication system, by configuring a hardware-based security environment, by developing a mechanism for the safe use of data, and by developing a technology for maintaining privacy.

Due to the research and development of the 6G communication system, the next hyper-connected experience is expected to be possible through the hyper-connectivity of the 6G communication system, which includes not only connectivity between objects but also connectivity between a human and an object. Specifically, the 6G communication system is expected to provide services, such as truly immersive extended reality (truly immersive XR), high-fidelity mobile hologram, and digital replica services. Moreover, the 6G communication system provides services, such as remote surgery, industrial automation, and emergency response, through security and reliability enhancement are provided through, thus being applied to various fields, such as industry, medical care, automobiles, and home appliances.

The quality of a video call using a smartphone may be controlled by adjusting the resolution of an image or the bit rate of a sound related to the video call, based on smartphone-related conditions (e.g., the processing capability of the smartphone, an available resolution, or a network environment). The range of a negotiated call quality may be specified by negotiating the maximum capability (e.g., codec or resolution processing capability) of the smartphone with the counterpart of the call in the initial stage of connection for the video call, after which the call quality may be adjusted within the range of the negotiated call quality range according to the state change. The call counterpart may be a counterpart terminal or a call server.

Recently, a large number of auxiliary devices (e.g., an AR device, a VR device, a smartwatch, and the like) linked to a smartphone are used. Some auxiliary devices may be used for a video call. When a specific auxiliary device is used for a video call, it is necessary for a mobile communication operator to recognize a main device and the auxiliary device (e.g., a smartphone) in combination as a single terminal. A group of terminals in which one or more devices are wired or wirelessly coupled to receive services may be referred to as a new terminal.

The commercialization of a new terminal enables a user to use voice and video calls of the related depending on the situation or to use an immersive video call based on 3D graphics (emoji) and a 3D realistic images when large-capacity information transmission and high processing capability are guaranteed.

The above information is presented as background information only to assist with an understanding of the disclosure. No determination has been made, and no assertion is made, as to whether any of the above might be applicable as prior art with regard to the disclosure.

SUMMARY

The quality of a video call using a smartphone may be controlled by adjusting the resolution of an image or the bit rate of a sound related to the video call, based on smartphone-related conditions (e.g., the processing capability of the smartphone, an available resolution, or a network environment). The range of a negotiated call quality may be specified by negotiating the maximum capability (e.g., codec or resolution processing capability) of the smartphone with the counterpart of the call in the initial stage of connection for the video call, after which the call quality may be adjusted within the range of the negotiated call quality range according to the state change. The call counterpart may be a counterpart terminal or a call server.

Recently, a large number of auxiliary devices (e.g., an AR device, a VR device, a smartwatch, and the like) linked to a smartphone are used. Some auxiliary devices may be used for a video call. When a specific auxiliary device is used for a video call, it is necessary for a mobile communication operator to recognize a main device and the auxiliary device (e.g., a smartphone) in combination as a single terminal. A group of terminals in which one or more devices are wired or wirelessly coupled to receive services may be referred to as a new terminal.

The commercialization of a new terminal enables a user to use voice and video calls of the related depending on the situation or to use an immersive video call based on 3D graphics (emoji) and a 3D realistic images when large-capacity information transmission and high processing capability are guaranteed.

Aspects of the disclosure are to address at least the above-mentioned problems and/or disadvantages and to provide at least the advantages described below. Accordingly, an aspect of the disclosure is to provide for supporting a call according to a plurality of modes.

Additional aspects will be set forth in part in the description which follows and, in part, will be apparent from the description, or may be learned by practice of the presented embodiments.

In accordance with an aspect of the disclosure, a method for supporting, by a first terminal, switching between a plurality of modes for a call is provided. The method includes performing a capability negotiation for a call with a second terminal, and establishing a first connection between the first terminal and a call server according to a first mode among the plurality of modes for the call with the second terminal after performing the capability negotiation, wherein the performing of the capability negotiation includes transmitting a first message including information indicating a media attribute of each of two or more modes of the plurality of modes to the call server.

In accordance with another aspect of the disclosure, a method for supporting, by a call server, switching between a plurality of modes for a call is provided. The method includes performing a capability negotiation for a call between a first terminal and a second terminal, and establishing a first connection between the first terminal and the call server according to a first mode among the plurality of modes for the call between the first terminal and the second terminal after performing the capability negotiation, wherein the performing of the capability negotiation includes receiving a first message including information indicating a media attribute for each of two or more modes among the plurality of modes from the first terminal.

In accordance with another aspect of the disclosure, a first terminal for supporting switching between a plurality of modes for a call is provided. The first terminal includes a transceiver, and at least one processor configured to be connected to the transceiver, wherein the at least one processor is configured to perform a capability negotiation for a call with a second terminal, and establish a first connection between the first terminal and a call server according to a first mode among the plurality of modes for the call with the second terminal after performing the capability negotiation, and the at least one processor is configured to transmit a first message including information indicating a media attribute of each of two or more modes of the plurality of modes to the call server in order to perform the capability negotiation.

In accordance with another aspect of the disclosure, a call server for supporting switching between a plurality of modes for a call is provided. The call server includes a transceiver, and at least one processor configured to be connected to the transceiver, wherein the at least one processor is configured to perform a capability negotiation for a call between a first terminal and a second terminal, and establish a first connection between the first terminal and the call server according to a first mode among the plurality of modes for the call between the first terminal and the second terminal after performing the capability negotiation, and the at least one processor is configured to receive a first message including information indicating a media attribute for each of two or more modes among the plurality of modes from the first terminal in order to perform the capability negotiation.

Specific details of other embodiments are included in the detailed description and drawings.

Embodiments disclosed herein have at least the following effect.

For example, it is possible to provide a seamless service in a call according to a plurality of modes using a main device and an auxiliary device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms "first", "second", and the like are used to describe various elements, these elements should not be limited by these terms. These terms are only used to distinguish one element from another element. Thus, a first element discussed below could be termed a second element without departing from the teachings of the disclosure.

Figure 1:
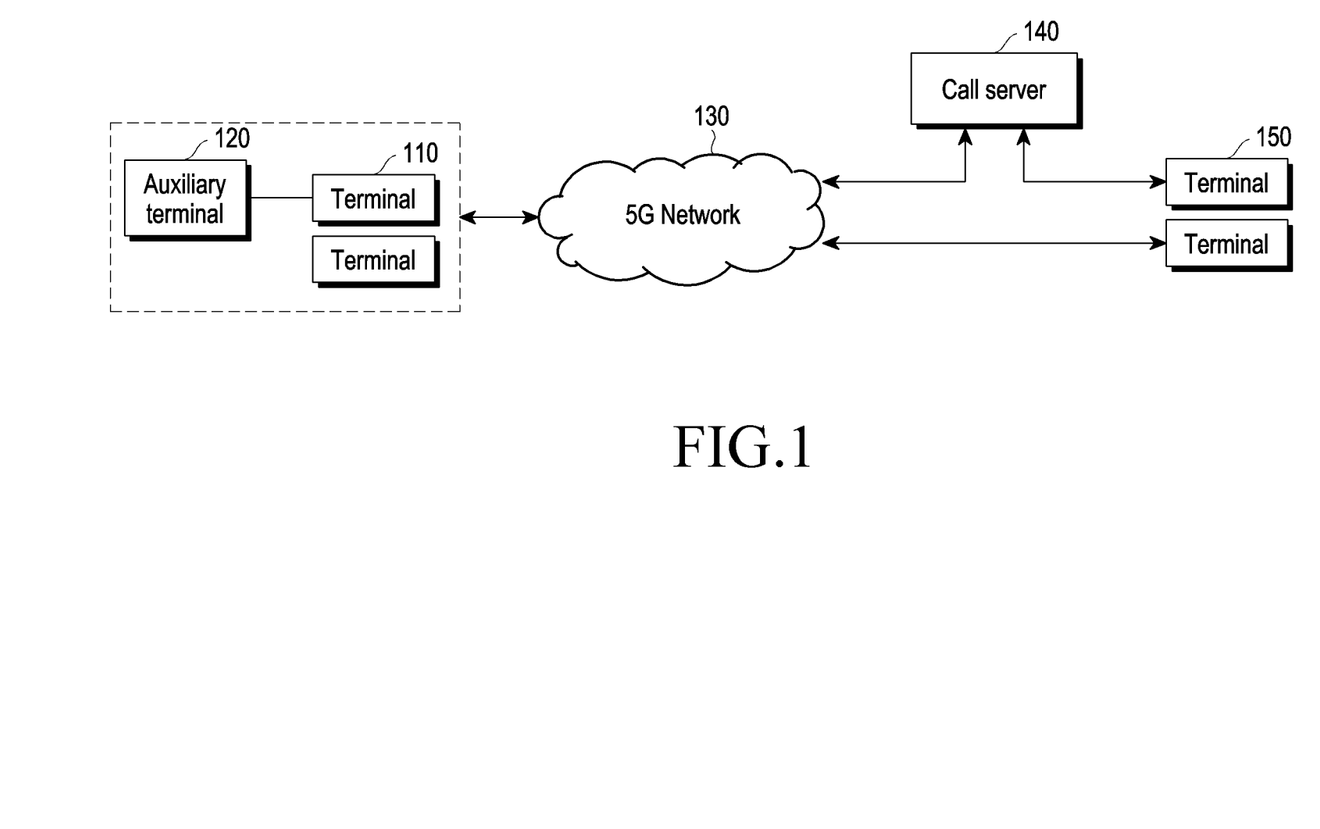
FIG. 1 is a block diagram illustrating a system for providing a call service according to an embodiment of the disclosure.

FIG. 1 is a block diagram illustrating a system for providing a call service according to an embodiment of the disclosure.

Referring to FIG. 1, a terminal 110 may receive a call service with a different counterpart terminal 150 via a 5G network 130. The terminal 110 may refer to a device capable of independently performing a call, such as a smartphone or a tablet PC. The terminal 110 may be referred to as a user equipment (UE), an electronic device, or the like and is not limited to the illustrated terms.

Although the 5G network 130 refers to a communication network according to a fifth-generation communication protocol specified by the 3rd Generation Partnership Project (3GPP), the 5G network 130 in FIG. 1 is merely an example of a communication network, and the disclosure is not necessarily applicable in the 5G network 130. The disclosure may be applied not only in the 5G network 130 but also in various communication networks to which various communication techniques, such as LTE, LTE-A, and CDMA, are applied.

When the terminal 110 performs a video call with a different counterpart terminal 150, a call server 140 may be involved. The call server 140 is configured to process multimedia associated with the video call. For example, the call server 140 may provide a function of re-encoding or mixing a sound or an image or a function of splitting a screen for the video call. According to some embodiments of the disclosure, the call server 140 may be involved not only for the video call but also for a voice call.

The terminal 110 may be connected to an auxiliary terminal 120 via a cable or wirelessly. The auxiliary terminal 120 may be one of an AR device, such as AR glasses, a VR device, a head-mounted display (HMD), a tablet PC, a smartwatch, and a smartphone separate from the terminal 110 but is not limited thereto. A mobile communication operator or the counterpart terminal 150 may recognize the terminal 110 and the auxiliary terminal 120 as a single terminal and may perform a call. The terminal 110 and the auxiliary terminal 120 may be referred to as a new terminal as mentioned above. According to some embodiments of the disclosure, the mobile communication operator or the counterpart terminal 150 may recognize the new terminal as the terminal 110. According to some embodiments of the disclosure, when the terminal 110 and the auxiliary terminal 120 can each independently perform a call and an agent of a call designated by a user or an agent of the call designated by the counterpart terminal 150 is the auxiliary terminal 120, the mobile communication operator or the counterpart terminal 150 may recognize the new terminal as the auxiliary terminal 120. For example, the auxiliary terminal 120 may actually function as a main terminal, and the terminal 110 may function as an auxiliary terminal. A main terminal and an auxiliary terminal may be relatively configured depending on a condition of an individual call.

A call between the new terminal and the counterpart terminal 150 may be distinguished through one of a plurality of modes. The plurality of modes may be distinguished according to whether the user directly uses the terminal 110 or the auxiliary terminal 120 for a call and a transmission method for media data used for the call, but conditions for distinguishing the plurality of modes are not limited thereto. Hereinafter, a plurality of modes for a call will be described with reference to FIG. 2.

Figure 2:
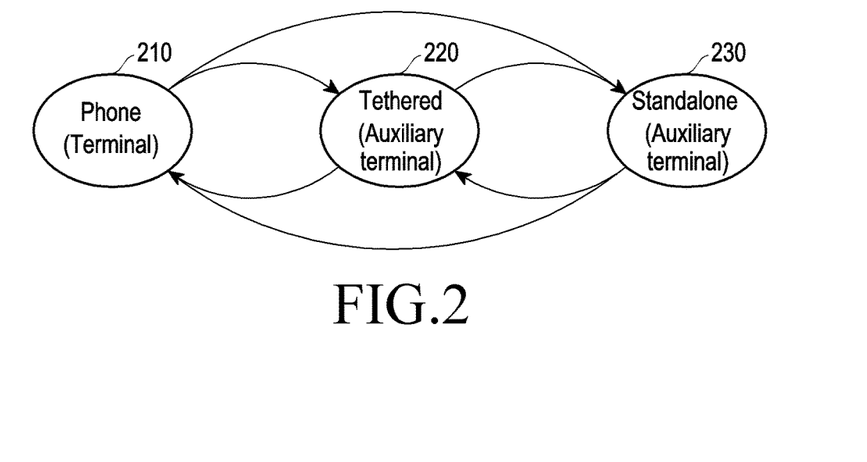
FIG. 2 illustrates a plurality of modes according to an embodiment of the disclosure.

FIG. 2 illustrates a plurality of modes according to an embodiment of the disclosure.

Referring to FIG. 2, the plurality of modes may include a phone mode 210, a tethered mode 220, and a standalone mode 230 but is not necessarily limited thereto.

In the phone mode 210, the user may perform a call with a counterpart terminal 150 using a terminal 110. In the phone mode 210, the auxiliary terminal 120 may not be involved in the call between the terminal 110 and the counterpart terminal 150.

In the tethered mode 220, the user may perform a call with the counterpart terminal 150 using the auxiliary terminal 120. In the tethered mode 220, the terminal 110 may receive media data for the call and may transmit the received media data to the auxiliary terminal 120 by tethering.

In the standalone mode 230, the user may perform a call with the counterpart terminal 150 using the auxiliary terminal 120. In the standalone mode 230, the auxiliary terminal 120 may directly receive media data for the call, not through the terminal 110. The auxiliary terminal 120 may include a modem device (e.g., a 5G modem chip) to directly receive media data through the 5G network 130 in the standalone mode 230.

Switching between modes may occur during a call. Switching between modes may occur by user manipulation. For example, switching between modes may occur by the user inputting a command to switch between modes to the terminal 110 or the auxiliary terminal 120. Switching between modes may be determined by the terminal 110 or the auxiliary terminal 120. In some embodiments of the disclosure, a device currently used by the user for a call among the terminal 110 and the auxiliary terminal 120 may determine switching. For example, the terminal 110 may determine switching during a call in the phone mode 210, and the auxiliary terminal 120 may determine switching during a call in the tethered mode 220 or the standalone mode 230. Whether to perform switching may be determined in view of the device capacity (e.g., the remaining capacity of a battery, the load of a processor, or the like) of the terminal 110 or the auxiliary terminal 120. In some embodiments of the disclosure, when the auxiliary terminal 120 includes a mountable display, such as AR glasses or an HMD, the auxiliary terminal 120 may determine whether to switch from the tethered mode 220 or the standalone mode 230 to the phone mode 210 in response to detecting that the user demounts the auxiliary terminal 120.

According to some embodiments of the disclosure, the call server 140 may determine switching between modes in view of a network state, the states of the terminals 110, 120, and 150, or whether mobile edge computing (MEC) can be supported. Whether MEC can be supported may be determined in view of a delay on a network or a 3D processing resource of the call server. When the call server 140 determines to switch, the server may notify the terminal 110 to change a mode and may prepare for simulcasting of media data according to a mode and media data of the related according to a changed mode. When receiving a response to the notification from the auxiliary terminal 120, the call server 140 may initiate the simulcasting.

When switching between modes is performed, negotiations not only for an initially used mode but also for at least one different mode may be simultaneously conducted in an initial capability negotiation to prevent a call service from being disconnected in order to perform a capability negotiation according to the new mode. Table 1 shows at least part of a message transmitted by the terminal 110 during an illustrative capability negotiation according to embodiments.

TABLE 1 m = video <media port> <media protocol>
a = <basic media attribute>
a = rid: <configuration ID#1> <media attribute of configuration ID#1>
a = rid: <configuration ID#2> <media attribute of configuration ID#2>
...
a = fallback_simulcast: <configuration ID>; <configuration ID>;...

The message of Table 1 may be a signaling message according to a session description protocol (SDP) and may be an SDP offer message or an SDP offer answer message. However, a protocol used for the capability negotiation in the embodiments is not necessarily limited to an SDP.

The message of Table 1 includes identifications (IDs) of two or more respective configurations and information indicating media attributes in the configurations. Each of the configurations refers to a configuration in one of the plurality of modes for a call. A media attribute refers to a media attribute or an optimal media attribute allowable in a mode indicated by a relevant configuration ID. The media attribute may include, for example, a codec, a resolution, a bit rate, and the like but is not necessarily limited thereto. According to an embodiment of Table 1, negotiations for media attributes of two or more modes may be performed through a single message in an initial capability negotiation, making it possible to perform switching between modes without a new capability negotiation, thus supporting seamless switching between modes. For example, when the terminal 110 performs a capability negotiation for a call with the counterpart terminal 150, even though an initial mode is the phone mode 210, a capability negotiation for one or more of the tethered mode 220 and the standalone mode 230 may be performed together with a capability negotiation for the phone mode 210, thereby switching to the tethered mode 220 and the standalone mode 230 without a subsequent additional capability negotiation.

The message of Table 1 may further include information indicating configuration IDs of modes in which simulcasting is performed during switching. When switching between modes associated with configuration IDs for simulcasting is performed, media data for both of a new mode and an existing mode may be simulcast during a period from when a connection according to the new mode is established to when a connection according to the existing mode is terminated. Accordingly, it is possible to provide a seamless service when switching between modes occurs during a call.

Table 2 is an example of a message configured for a capability negotiation.

TABLE 2 m = video 49154 RTP/AVPF 101
a = rtpmap: 101 H264/90000
a = imageattr: 101 send [x=1280, y=720] [x=840, y=480] [x=640, y=360] [x=320, y=240] \
    [x=176, y=144] [x=244, y-176] [x=320, y=180]
a = rid: 0 send pt=101 max-width=1280;max-height=720
/* maximum resolution in standalone mode */
a = rid: 1 send pt-101 max-width-640;max-height=360
/* maximum resolution in tethered mode */
a= fallback_siumlcast: send 0;1

Table 2 shows an illustrative message for a media attribute negotiation associated with a video media stream when a real-time transport protocol (RTP) is used as a transmission protocol. In the message of Table 2, a configuration ID in the standalone mode is configured as 0, and a configuration ID in the tethered mode is configured as 1. Further, the illustrative message of Table 2 includes information indicating a maximum resolution for configuration ID 0 and information indicating a maximum resolution for configuration ID 1. Additionally, the illustrative message of Table 2 includes information indicating that when switching between the standalone mode and the tethered mode is performed, media data according to the two modes need to be simulcast.

Table 3 is another example of a message configured for a capability negotiation.

TABLE 3 m = video 49154 RTP/AVPF 101 102
a = rtpmap: 101 H264/90000
a = rtpmap: 102 H265/90000
a = imageattr: 101 send [x=1280, y=720] [x=840, y=480] [x=640, y-360] [x=320, y=240]
a = imageattr: 102 send [x=1920, y=1080] [x=1280, y=720] [x=848, y=480] [x=640, y=360] [x=320, y=240]

TABLE 3-continued

```
a = rid: 0 send pt=101
a = rid: 1 send pt=101
a= fallback_siumlcast: send 0;1
```

Table 3 shows an illustrative message for a media attribute negotiation associated with a video media stream when the RTP is used as a transmission protocol. According to the message of Table 3, different codecs are applied for configurations for the two modes. A stream of RTP payload type 101 based on an H.264 codec is used in configuration 1 (rid 0), and a stream of RTP payload type 102 based on an H.265 codec is used in configuration 2 (rid 1). "a=fallback_simlcast: send 0,1" indicates that when switching between a mode associated with configuration 1 and a mode associated with configuration 2 is performed, media data of the two modes need to be simultaneously transmitted. Entries with "a=imageattr: . . . " indicate that different resolutions are applicable in configuration 1 and configuration 2. For example, the example of Table 3 indicates that the message transmitted in the capability negotiation process includes information indicating a codec and at least one resolution available in each mode.

According to some embodiments of the disclosure, the message for capability negotiation may be transmitted again by the terminal 110 to the call server 140 for additional capability negotiation or a change of capability negotiation details after the initial capability negotiation is performed.

According to some embodiments of the disclosure, when the terminal 110 determines whether to switch, the terminal 100 may change a media attribute of media data transmitted in simulcasting. For example, when switching is performed from the standalone mode 230 having a maximum resolution of 1080*720 to the tethered mode 220 having a maximum resolution of 720*480, the terminal 110 may change the resolution of media data for the standalone mode 230, which is transmitted to the auxiliary terminal 120 in simulcasting, to 720*480.

When the call server 140 determines whether to switch, a media attribute changed according to mode switching may be determined by the call server 140 but is not limited thereto, and the terminal 110 may automatically determine whether to switch according to a predefined method.

To perform switching between modes, a procedure of performing negotiations for the modes in advance, determining a mode change during a call, establishing a new connection according to a new mode with an existing connection maintained, performing simulcasting for both the new connection and existing connection, and terminating the existing connection is needed.

The procedure for the mode change may be performed using various transmission periods and protocols. For example, a mode may be changed by temporarily performing point-to-multipoint (PtM) transmission before/after the mode change through point-to-point (PtP)/PtM switching. However, in this case, PtM radio resources need to be allocated only for the two modes, thus causing inefficiency in resources and not individually guaranteeing QoS in a PtM configuration period according to the modes.

The procedure for the mode change may be performed by configuring a connection path according to the new mode as a proxy so that media data needs to be transmitted necessarily through the connection path for the new mode, which will be described with reference to FIG. 3.

Figure 3:
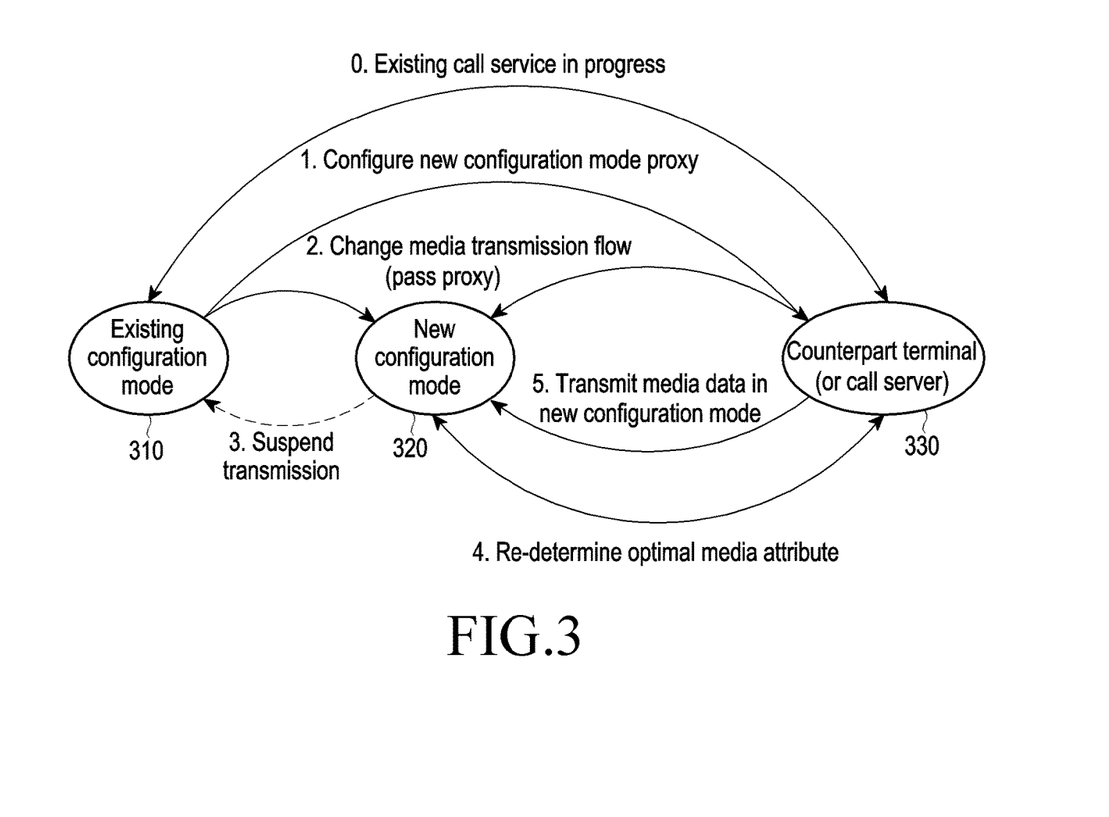
FIG. 3 illustrates a mode switch method using a proxy a according to an embodiment of the disclosure.

FIG. 3 illustrates a mode switch method using a proxy according to an embodiment of the disclosure.

Referring to FIG. 3, when switching to a new configuration mode 320 is determined while a call service according to an existing configuration mode 310 is in progress (0), a connection path according to the new configuration mode 320 is configured as a proxy for the existing configuration mode 310 (1). Accordingly, media data to a counterpart terminal (or call server) 300 or from the counterpart terminal (or call server) 330 according to the existing configuration mode 310 passes through the connection path of the new configuration mode 320 configured as the proxy (2). Subsequently, transmission of the media data according to the existing configuration mode 310 using the connection path of the new configuration mode 320 as the proxy is suspended (3), an optimal media attribute for the new configuration mode 320 is re-determined (4), and the media data is transmitted in the new configuration mode according to the determined optimal media attribute (5).

According to embodiments of the disclosure, to implement a procedure for changing modes, an existing connection between two points (or between a terminal and a call server) may be temporarily changed to a mode similar to that of a point-to-multipoint call, thereby adding a connection according to a new mode and subsequently releasing a connection according to an existing mode. According to this method, the connection according to the new mode may be added with the existing connection maintained, and the existing connection may be released when the new connection is completely added, thereby enabling efficient and seamless switching between the modes while continuously ensuring the QoS of each individual connection. A relevant embodiment will be described with reference to FIG. 4 and FIG. 5.

Figure 4:
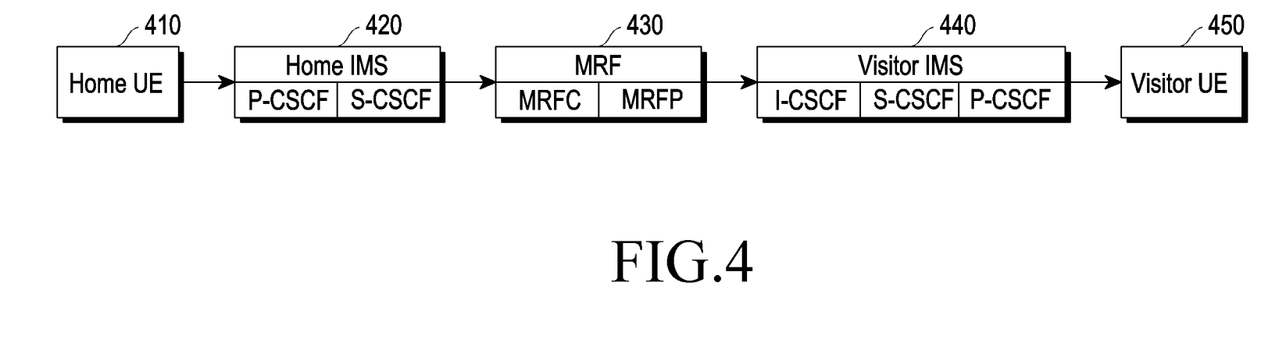
FIG. 4 illustrates a flow of media data for a call service according to an embodiment of the disclosure.

FIG. 4 illustrates a flow of media data for a call service according to an embodiment of the disclosure.

Referring to FIG. 4, it shows that media data is transmitted from a home UE 410 to a visitor UE 450 via a home IP multimedia system (IMS) 420, a media resource function (MRF) 430, and a visitor IMS 440. On the contrary, media data may also be transmitted from the visitor UE 450 to the home UE 410 for a two-way call.

The home UE 410 refers to a UE (calling UE) making a call, and the visitor UE 450 refers to a UE (called UE) receiving the call. An IMS refers to a system to control IP multimedia flow in a communication operator network to which each terminal is connected. The IMS may be classified as a proxy-call session control function (P-CSCF), a serving-CSCF (S-CSCF), or an interrogation-CSCF (I-CSCF) according to functions. The home IMS 420 refers to an IMS of a communication operator to which the home UE 410 is connected, and the visitor IMS 440 is an IMS of a communication operator to which the visitor UE 450 is connected.

The MRF 440 may correspond to the call server 140 of FIG. 1. The MRF 440 may provide various multimedia processing functions, such as mixing of a sound or an image related to the call and screen splitting. The MRF 440 may be divided into an MRF processor (MRFP) responsible for substantial multimedia processing and an MRF controller (MRFC) to control the MFRP.

Figure 5:
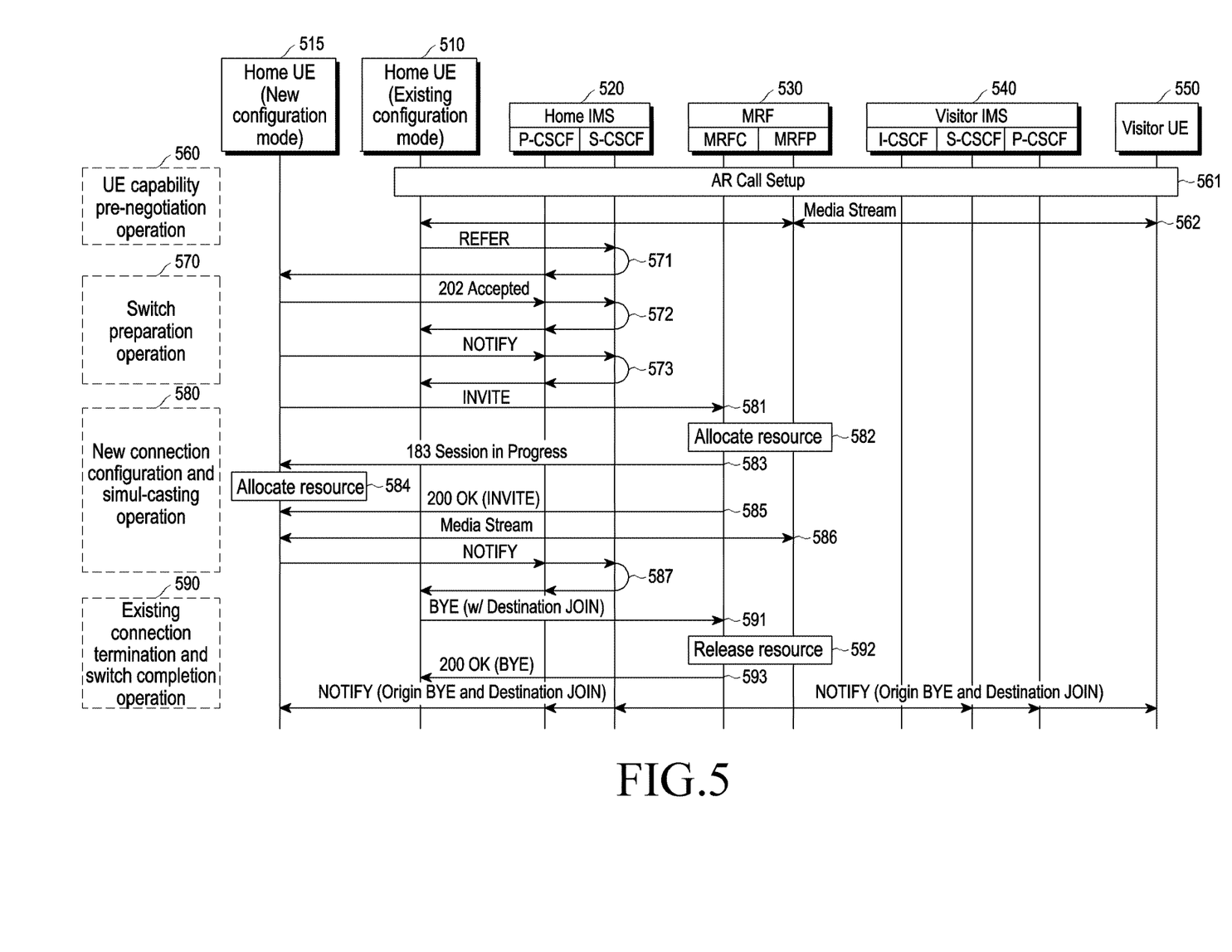
FIG. 5 illustrates a mode switch procedure according to an embodiment of the disclosure.

FIG. 5 illustrates a mode switch procedure according to an embodiment of the disclosure.

Referring to FIG. 5, although a home UE in an existing configuration mode (hereinafter, referred to as an existing home UE) 510 may correspond to the terminal 110 of FIG. 1 and a home UE in a new configuration mode (hereinafter, referred to as a new home UE) 515 may correspond to the auxiliary terminal 120 of FIG. 1, the embodiment is not necessarily limited thereto. For example, when the existing mode is the standalone mode 230 and the new mode that is switched is the phone mode 210, the existing home UE 510 may correspond to the auxiliary terminal 120, and the new home UE 515 may correspond to the terminal 110. In some embodiments of the disclosure, when the existing mode is the tethered mode 220, the existing home UE 510 may correspond to the terminal 110.

First, to perform a call, operation 560 of negotiating a terminal capability in advance between the existing home UE 510 and the visitor UE 550 may be performed. A capability negotiation may be performed according to a session initiation protocol (SIP)/SDP but is not limited thereto. Negotiating the terminal capability may include the existing home UE 510 transmitting a capability negotiation message mentioned in Table 1 to Table 3 to the MRF 530. As described above, since the capability negotiation message includes pieces of information indicating media attributes for two or more modes, negotiations for not only the existing mode initially used for the call but also the new mode that is switched may be performed at once. In some embodiments of the disclosure, the capability negotiation message may be transmitted to not only the MRF 530 but also the visitor UE 550.

When the capability negotiation is completed, an AR call may be established between the existing home UE 510 and the visitor UE 550 according to the initial call mode (i.e., the existing mode) in operation 561. Although FIG. 5 illustrates the AR call, the disclosure may be applied to not only the AR call but also general video and voice calls. The call may be established based on the capability negotiation for the existing mode. For example, the call may be established based on information indicating a media attribute for the existing mode included in the capability negotiation message.

After the call is established between the existing home UE 510 and the visitor UE 550, a media stream (i.e., media data) may be exchanged between the existing home UE 510 and the visitor UE 562 via the MRF 530 according to the existing mode.

When a mode switch is determined, a switch preparation operation 570 may be performed. The mode switch may be determined by the existing home UE 510 in view of the load of a processor associated with the existing home UE 510 or the new home UE 515, a battery state, a network state, or the like, may be determined by the MRF 530 in view of whether MEC can be supported, a delay on a network, or a 3D processing resource of the MRF 530, or may be determined based on a user input or command.

The switch preparation operation 570 includes an operation in which the existing home UE 510 notifies the new home UE 515 of an address (e.g., a uniform resource indicator (URI) or a uniform resource locator (URL)) of the MRF 530 in operation 571. The existing home UE 510 may transmit a message including information indicating the address of the MRF 530 to the new home UE 515, and in some embodiments of the disclosure, the message may be transmitted through an REFER method of the SIP. The message may be transmitted from the existing home UE 510 to the new home UE 515 through a home IMS 520 without passing through the MRF 530. Table 4 shows an illustrative SIP request message or SIP response message according to the REFER method as an illustrative message for the existing home UE 510 to notify the new home UE 515 of the address of the MRF 530.

TABLE 4

| REFER sip: VisitorUE_address SIP/2.0 |
|---|
| Via: <HomeUE_new mode_address> |
| To: <VisitorUE_address> |
| From: < HomeUE_existing mode_address> |
| Refer-To: <MRF server address> |

The switch preparation operation 570 may further include an operation 572 in which the new home UE 515 transmits an acknowledgment of the message including the address of the MRF 530 to the existing home UE 510. A message including the acknowledgment may be transmitted from the new home UE 515 to the existing home UE 510 through the home IMS 520 without passing through the MRF 530.

The switch preparation operation 570 may further include an operation 573 in which the new home UE 515 transmits a message for reporting that it is ready to establish a new connection with the MRF 530 to the existing home UE 510 after the operation 572 of transmitting the acknowledgement. The message for reporting that it is ready to establish the new connection with the MRF 530 may be may be transmitted from the new home UE 515 to the existing home UE 510 through the home IMS 520 without passing through the MRF 530.

After the switch preparation operation 570, a new connection configuration and simulcasting operation 580 may be performed. In the new connection configuration and simulcasting operation 580, the new connection is configured according to the switched new mode, and media data is simulcast until the existing connection is terminated.

The new connection configuration and simulcasting operation 580 may include an operation 581 in which the new home UE 515 transmits a message for connection to the MRF 530. The new home UE 515 may transmit an INVITE message to the MRF 530 in order to connect to the MRF 530. Connection of the new home UE 515 to the MRF 530 may be based on the address of the MRF 530 received from the existing home UE 510.

In response to receiving the message for the connection from the new home UE 515, the MRF 530 may allocate a resource for the connection according to the new mode to the new home UE 515 in operation 582.

The MRF 530 may transmit a message for reporting the allocated resource to the new home UE 515 in operation 583.

In response to receiving the message for reporting the allocated resource from the MRF 530, the new home UE 515 may allocate the resource for the new connection according to the new mode in operation 584.

After transmitting the message for reporting the allocated resource to the new home UE 515 in operation 583, the MRF 530 may transmit a message for reporting to the new home UE 515 that the new connection according to the new mode has been established in operation 585.

Subsequently, a media stream for the new mode may be transferred between the new home UE 515 and the MRF 530 in operation 586 through the new connection. Here, since the media stream for the existing mode is transmitted through the existing connection, simulcasting through both the new connection and the existing connection may be performed.

Next, the new home UE 515 may transmit a message for reporting to the existing home UE 510 that the new connection according to the new mode has been established in operation 587. The message for reporting that the new connection has been established may be transmitted from the new home UE 515 to the existing home UE 510 through the home IMS 520 without passing through the MRF 530.

After the new connection configuration and simulcasting operation 580, an existing connection termination and switch completion operation 590 may be performed.

In the switch completion operation 590, the existing home UE 510 may transmit a message for releasing the existing connection to the MRF 530 in operation 591. The message for releasing the connection may further include information for reporting that the new connection has been completely established. For example, the message for releasing the existing connection may be a BYE message according to a BYE method of the SIP but is not necessarily limited thereto. Table 5 is an illustrative BYE message including a request to terminate the connection according to the existing mode and to change to the connection according to the new mode.

TABLE 5

BYE sip: VisitorUE_address SIP/2.0
To: <VisitorUE_address>
From: <HomeUE_existing mode_address>
Next-From: <HomeUE_new mode_address>

In response to receiving the message for releasing the existing connection from the existing home UE 510, the MRF 530 may release resource allocation for the existing connection in operation 592.

After releasing the resource allocation for the existing connection in operation 592, the MRF 530 may report to the existing home UE 510 that the existing connection has been released in operation 953.

After releasing the resource allocation for the existing connection in operation 592, the MRF 530 may transmit a message for reporting to the visitor UE 550 that a home UE has been changed from the existing home UE 510 to the new home UE 515 in operation 594. Table 6 shows an illustrative NOTIFY message according to the SIP for reporting a change of a home UE.

TABLE 6

NOTIFY sip: VisitorUE_address SIP/2.0
To: <VisitorUE_address>
From: <MRF_address>
Event: reconnect
Subscription-State: transition-complete
Content-Type: application/reconnection+xml
<reconnection>
 <active_URI="HomeUE_new mode_address" />
 <inactive_URI="HomeUE_existing mode_address" />
</reconnection>

When a multilateral call is in progress, the message for reporting that the home UE has been changed from the existing home UE 510 to the new home UE 515 may be transmitted to all visitor UEs.

Figure 6:
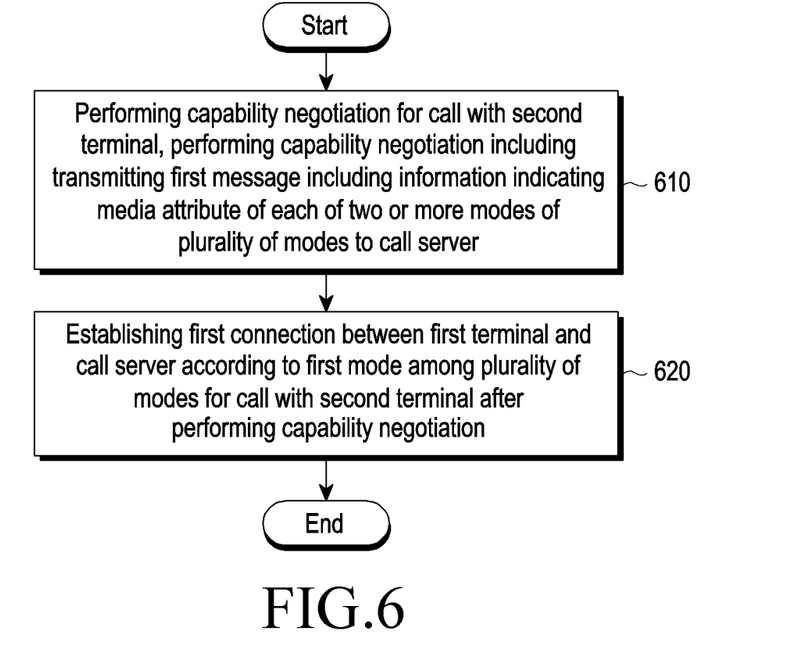
FIG. 6 is a flowchart illustrating an operation of a terminal according to an embodiment of the disclosure.

FIG. 6 is a flowchart illustrating an operation of a terminal according to an embodiment of the disclosure.

Referring to FIG. 6, a method for supporting, by a first terminal, switching between a plurality of modes for a call may include an operation 610 of performing a capability negotiation for a call with a second terminal and an operation 620 of establishing a first connection between the first terminal and a call server according to a first mode among the plurality of modes for the call with the second terminal after performing the capability negotiation. The operation of performing the capability negotiation may include an operation of transmitting a first message including information indicating a media attribute for each of two or more modes among the plurality of modes to a communication server.

The first terminal may correspond to the terminal 110 of FIG. 1 or the existing home UE 510 of FIG. 5. The second terminal may correspond to the counterpart terminal 150 of FIG. 1 or the visitor UE 550 of FIG. 5.

The media attribute may include at least one of a resolution and a codec supported in each of the modes.

The plurality of modes may include a phone mode in which a user performs the call using the first terminal, a tethered mode in which the first terminal transmits data associated with the call to a third terminal by tethering and the user performs the call using the third terminal, and a standalone mode in which the third terminal directly receives the data associated with the call. Here, the third terminal may correspond to the auxiliary terminal 120 of FIG. 1 or the new home UE 515 of FIG. 5.

The first message may further include information indicating modes in which simulcasting is performed when switching between the modes among the two or more modes.

Figure 7:
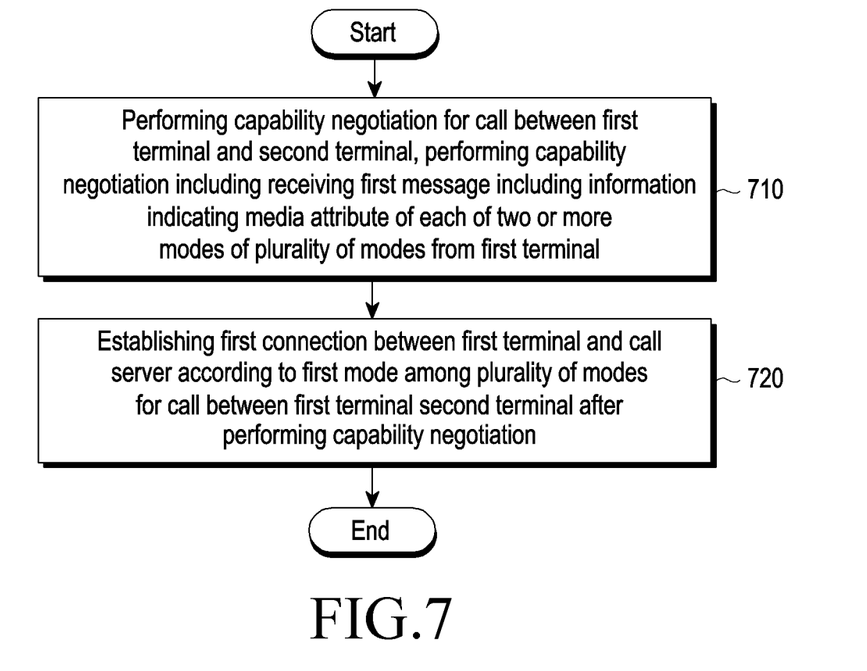
FIG. 7 is a flowchart illustrating an operation of a communication server according to an embodiment of the disclosure.

FIG. 7 is a flowchart illustrating an operation of a call server according to an embodiment of the disclosure.

Referring to FIG. 7, a method for supporting, by a call server, switching between a plurality of modes for a call according to an embodiment includes an operation 710 of performing a capability negotiation for a call between a first terminal and a second terminal and an operation 720 of establishing a first connection between the first terminal and the call server according to a first mode among the plurality of modes for the call between the first terminal and the second terminal after performing the capability negotiation. The operation of performing the capability negotiation may include an operation of receiving a first message including information indicating a media attribute for each of two or more modes among the plurality of modes from the first terminal.

The first terminal may correspond to the terminal 110 of FIG. 1 or the existing home UE 510 of FIG. 5. The second terminal may correspond to the counterpart terminal 150 of FIG. 1 or the visitor UE 550 of FIG. 5.

The media attribute may include at least one of a resolution and a codec supported in each of the modes.

The plurality of modes may include a phone mode in which a user performs a call using the first terminal, a tethered mode in which the first terminal transmits data associated with the call to a third terminal by tethering and the user performs the call using the third terminal, and a standalone mode in which the third terminal directly receives data associated with the call. Here, the third terminal may correspond to the auxiliary terminal 120 of FIG. 1 or the new home UE 515 of FIG. 5.

The first message may further include information indicating modes in which simulcasting is performed when switching between modes among the two or more modes.

Figure 8:
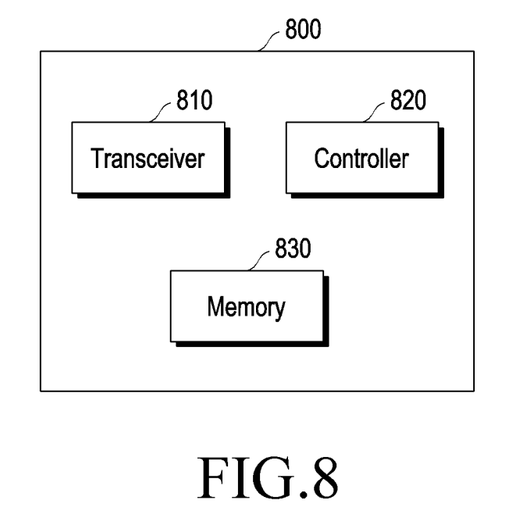
FIG. 8 is a block diagram illustrating an electronic device according to an embodiment of the disclosure.

FIG. 8 is a block diagram illustrating an electronic device according to an embodiment of the disclosure.

Referring to FIG. 8, the electronic device 800 may correspond to one of the electronic devices mentioned herein. For example, the electronic device 800 may correspond to any one of the terminal 110, the auxiliary terminal 120, the call server 140, the counterpart terminal 150, which are illustrated in FIG. 1, the existing home UE 510, the new home UE 515, the home IMS 520, the MRF 530, the visitor IMS 540, and the visitor UE 550, which are illustrated in FIG. 5.

The electronic device 800 may include a transceiver 810 and a controller 820. The transceiver 810 may be configured to transmit or receive a signal or data to or from a different device via a cable or wirelessly. The transceiver 810 may perform communication using various communication methods, such as known Wi-Fi, LTE, LTE-A, CDMA, orthogonal frequency division multiplexing (OFDM), and coded OFDM (COFDM), but communication methods available for the transceiver 810 are not necessarily limited thereto.

The controller 820 may be connected to the transceiver 810. The controller 820 may include at least one processor. The controller 820 may control overall operations of the electronic device 800, and thus an operation of the electronic device 800 may be construed as an operation of the controller 820.

The electronic device 800 may further include a memory 830. The memory 830 may be connected to the controller 820. The memory 830 may store pieces of temporary or permanent information necessary for an operation of the controller 820. The memory 830 is executable by the controller 820 and may include commands to drive the controller 820.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for supporting, by a first terminal, switching between a plurality of modes for a call, the method comprising:
    performing a capability negotiation for a call with a second terminal; and
    establishing a first connection between the first terminal and a call server according to a first mode among the plurality of modes for the call with the second terminal after performing the capability negotiation,
    wherein the performing of the capability negotiation comprises transmitting a first message comprising information indicating a media attribute of each of two or more modes of the plurality of modes to the call server, and information indicating modes in which simulcasting is performed when switching between the modes of the two or more modes, and
    wherein the plurality of modes comprises a phone mode in which a user performs the call using the first terminal, a tethered mode in which the first terminal transmits data related to the call to a third terminal associated with the first terminal by tethering and the user performs the call using the third terminal, and a stand-alone mode in which the third terminal directly receives the data related to the call.

2. The method of claim 1, further comprising:
    transmitting a second message comprising an address of the call server to a third terminal associated with the first terminal;
    receiving a third message for identifying reception of the second message from the third terminal; and
    receiving, from the third terminal, a fourth message for notifying that the third terminal is ready for a second connection between the third terminal and the call server according to a second mode among the plurality of modes after receiving the third message,
    wherein the second message, the third message, and the fourth message are transmitted through an IP multimedia subsystem (IMS) for the first terminal without passing through the call server.

3. The method of claim 2, further comprising:
    receiving, from the third terminal, a fifth message for indicating that the second connection is established; and
    terminating the first connection in response to receiving the fifth message,
    wherein simulcasting is performed through both the first connection and the second connection before the first connection is terminated after the second connection is established, and
    wherein terminating the first connection comprises transmitting, to the call server, a sixth message for terminating the first connection, and the sixth message comprises an address of the third terminal.

4. The method of claim 1, wherein the media attribute comprises at least one of a resolution and a codec supported in each of the two or more modes.

5. A method for supporting, by a call server, switching between a plurality of modes for a call, the method comprising:
    performing a capability negotiation for a call between a first terminal and a second terminal; and
    establishing a first connection between the first terminal and the call server according to a first mode among the plurality of modes for the call between the first terminal and the second terminal after performing the capability negotiation,
    wherein the performing of the capability negotiation comprises receiving a first message comprising information indicating a media attribute for each of two or more modes among the plurality of modes from the first terminal, and information indicating modes in which simulcasting is performed when switching between the modes of the two or more modes, and
    wherein the plurality of modes comprises a phone mode in which a user performs the call using the first terminal, a tethered mode in which the first terminal transmits data related to the call to a third terminal associated with the first terminal by tethering and the user performs the call using the third terminal, and a stand-alone mode in which the third terminal directly receives the data related to the call.

6. The method of claim 5, further comprising:
    receiving a second message for establishing a second connection according to a second mode among the plurality of modes from a third terminal associated with the first terminal;
    allocating a resource for the second connection in response to receiving the second message;
    transmitting, to the third terminal, a third message indicating that the resource for the second connection is allocated;
    receiving, from the first terminal, a fourth message for terminating the first connection after the second connection is established, wherein the fourth message comprises an address of the third terminal;
    releasing resources for the first connection in response to receiving the fourth message;
    transmitting, to the first terminal, a fifth message indicating that the resources for the first connection are released; and
    transmitting, to the second terminal, a sixth message indicating that a counterpart terminal is changed from the first terminal to the second terminal after the resources for the first connection are released.

7. The method of claim 5, wherein the media attribute comprises at least one of a resolution and a codec supported in each of the two or more modes.

8. A first terminal for supporting switching between a plurality of modes for a call, the first terminal comprising:
a transceiver; and
at least one processor coupled to the transceiver,
wherein the at least one processor is configured to:
perform a capability negotiation for a call with a second terminal,
establish a first connection between the first terminal and a call server according to a first mode among the plurality of modes for the call with the second terminal after performing the capability negotiation, and
transmit a first message comprising information indicating a media attribute of each of two or more modes of the plurality of modes to the call server in order to perform the capability negotiation, and information indicating modes in which simulcasting is performed when switching between the modes of the two or more modes, and
wherein the plurality of modes comprises a phone mode in which a user performs the call using the first terminal, a tethered mode in which the first terminal transmits data related to the call to a third terminal associated with the first terminal by tethering and the user performs the call using the third terminal, and a standalone mode in which the third terminal directly receives the data related to the call.

9. The first terminal of claim 8, wherein the at least one processor is further configured to:
transmit a second message comprising an address of the call server to a third terminal associated with the first terminal,
receive a third message for identifying reception of the second message from the third terminal, and
receive, from the third terminal, a fourth message for notifying that the third terminal is ready for a second connection between the third terminal and the call server according to a second mode among the plurality of modes after receiving the third message,
wherein the second message, the third message, and the fourth message are transmitted through an IP multimedia subsystem (IMS) for the first terminal without passing through the call server.

10. The first terminal of claim 9, wherein the at least one processor is further configured to:
receive, from the third terminal, a fifth message for indicating that the second connection is established, and
terminate the first connection in response to receiving the fifth message,
wherein simulcasting is performed through both the first connection and the second connection before the first connection is terminated after the second connection is established, and
wherein for terminating the first connection, the at least one processor is further configured to transmit, to the call server, a sixth message for terminating the first connection, and the sixth message comprises an address of the third terminal.

11. The first terminal of claim 8, wherein the media attribute comprises at least one of a resolution and a codec supported in each of the two or more modes.

12. A call server for supporting switching between a plurality of modes for a call, the call server comprising:
a transceiver; and
at least one processor coupled to the transceiver,
wherein the at least one processor is configured to:
perform a capability negotiation for a call between a first terminal and a second terminal,
establish a first connection between the first terminal and the call server according to a first mode among the plurality of modes for the call between the first terminal and the second terminal after performing the capability negotiation, and
receive a first message comprising information indicating a media attribute for each of two or more modes among the plurality of modes from the first terminal in order to perform the capability negotiation, and information indicating modes in which simulcasting is performed when switching between the modes of the two or more modes, and
wherein the plurality of modes comprises a phone mode in which a user performs the call using the first terminal, a tethered mode in which the first terminal transmits data related to the call to a third terminal associated with the first terminal by tethering and the user performs the call using the third terminal, and a standalone mode in which the third terminal directly receives the data related to the call.

13. The call server of claim 12, wherein the at least one processor is further configured to:
receive a second message for establishing a second connection according to a second mode among the plurality of modes from a third terminal associated with the first terminal,
allocate a resource for the second connection in response to receiving the second message,
transmit, to the third terminal, a third message indicating that the resource for the second connection is allocated,
receive, from the first terminal, a fourth message for terminating the first connection after the second connection is established, wherein the fourth message comprises an address of the third terminal,
release resources for the first connection in response to receiving the fourth message,
transmit, to the first terminal, a fifth message indicating that the resources for the first connection are released, and
transmit, to the second terminal, a sixth message indicating that a counterpart terminal is changed from the first terminal to the second terminal after the resources for the first connection are released.

14. The call server of claim 12, wherein the media attribute comprises at least one of a resolution and a codec supported in each of the two or more modes.

\* \* \* \* \*